United States Patent [19]

De Steur et al.

[11] 4,283,142
[45] Aug. 11, 1981

[54] TWO BEAM ALTERNATING LIGHT COLORIMETER

[75] Inventors: Hubert De Steur, Drongen; Chris Vandenbossche, Zwijnaarde; Guido Heyneman, Knokke, all of Belgium

[73] Assignee: Siemens Aktiengesellschaft, Berlin & Munich, Fed. Rep. of Germany

[21] Appl. No.: 108,461

[22] Filed: Dec. 31, 1979

[30] Foreign Application Priority Data

Feb. 12, 1979 [DE] Fed. Rep. of Germany ....... 2905230

[51] Int. Cl.³ .......................... G01J 3/08; G01J 3/42; G01N 21/27
[52] U.S. Cl. .................................. 356/319; 356/325; 356/408; 356/434
[58] Field of Search ............... 356/319, 323, 324, 325, 356/408, 425, 434, 448; 250/575

[56] References Cited

U.S. PATENT DOCUMENTS

| | | | |
|---|---|---|---|
| 4,063,817 | 12/1977 | Shimamura et al. | 356/325 |
| 4,092,069 | 5/1978 | Fukuda et al. | 356/325 |

FOREIGN PATENT DOCUMENTS 2536188 2/1977 Fed. Rep. of Germany .

Primary Examiner—Vincent P. McGraw
Attorney, Agent, or Firm—Hill, Van Santen, Steadman, Chiara & Simpson

[57] ABSTRACT

A two beam alternating light colorimeter is disclosed wherein a light beam passing through a lens system having a shutter is periodically deflected by a pivoting mirror. In a first non-deflecting position of the pivotable mirror a first measuring beam is created which passes through a first measuring cell and is guided to a common photo cell. In a second deflecting position of the mirror a second measuring beam is created which is guided through a second measuring cell to the same photo cell. Signals from the photo cell are connected through a controlled switching element to an analog memory. A computing circuit is provided which connects to an output of the analog memory and also to the photo cell. The switching element connects the first measuring signal to the analog memory when the mirror is in a non-deflecting position and opens when the mirror is in a deflecting position. The computing circuit compares the signals corresponding to the first and second measuring beams.

6 Claims, 4 Drawing Figures

TWO BEAM ALTERNATING LIGHT COLORIMETER

BACKGROUND OF THE INVENTION

The invention concerns a two beam alternating light colorimeter consisting of an illumination lens system and a control device, which, with the help of two stationary reflecting mirrors, deflects the measuring beam which is produced by a light source in alternating fashion through a first measuring cell and following this through a second measuring cell onto a common light sensitive element or cell. A measuring and evaluating circuit is also provided which is connected with the light sensitive element.

The advantage of a two beam alternating light colorimeter of this sort with respect to the other known one beam and two beam colorimeters consists in the use of a single radiation deflector in the form of a light sensitive element for the measuring and comparing beam signal. By means of the use of two measuring cells conducting the object liquid wherein one has a comparatively great thickness and the other displays only a half thickness, it becomes possible to compensate the measured value falsifications which are brought about by means of dirt accumulations of the cell windows. By means of the use of measuring cells of the same layer thickness wherein one contains the object liquid and the other contains a reactive fluid, it becomes possible to compensate the reactive components. By means of processing of the electrical measuring signals according to the photometric law of absorption, it becomes possible to determine the concentration of the components which are to be measured in the object liquid. The known two beam, alternating light colorimeters possess a control device which guides the measuring beam produced by an illumination lens system as an alternating pulse first through a first measuring cell and following this through a second measuring cell. For this, usually a rotary shutter (chopper disc) is used, where, by means of a mirror system, the measuring beam which was produced by the illumination lens system is directed to the cell windows of the two measuring cells. The measuring signal which was provided by the single photoresistor or respectively, light sensitive element is conveyed to a measuring circuit where the output voltage of the measuring circuit is a measurement for the concentration of the object liquid.

A two beam chopped light colorimeter of this kind became known through German OS 2,536,188, incorporated herein by reference, in the case of which in the path of the measuring beam which is coming from the illumination lens system, a semitransparent mirror is arranged at an angle of 45°. In this way, the portion of the measuring beam which is reflected by the semitransparent mirror is deflected by 90° relative to the portion of the measuring beam which is allowed to pass through. By means of a respective additional mirror in the optical path of both partial measuring beams, these are deflected to the light sensitive elements. Since both partial beams constantly act upon the light sensitive element, a rotating shutter is provided which brings the two beams into a chopped effect. Also, synchronizing switches must be provided which must be controlled in dependence upon the rotating shutter disc. With the help of these synchronizing switches, the output signals of the measuring beams are provided to corresponding analog memories from which they are supplied for further evaluation.

This known two beam alternating colorimeter requires a significant expenditure for the mechanical arrangement and electronics on the one hand because of the rotating shutter and on the other hand because of the storage of both signals.

SUMMARY OF THE INVENTION

It is an object of the invention to create a two-beam alternating light colorimeter which is less complex and expensive, and thus is also less susceptible to interference than the known colorimeters. This problem is solved according to the invention wherein the control device is a mirror which is pivotable into the beam path of the measuring beam. This mirror deflects the measuring beam which was produced by the light source by 90° in a preferred embodiment.

With respect to the known two beam alternating light colorimeters, the one according to the invention displays the significant advantage that no rotating parts are used which necessarily are subject to maintenance and wear. Further, with respect to the colorimeter which became known with German OS 2,536,188 incorporated herein by reference, also the advantage is attained that no semitransparent mirror needs to be used. Since mirrors of this kind cannot divide the measuring beam in precisely the same fashion, additional adjusting techniques must be resorted to. Also, a particular advantage with respect to the known colorimeters is that in the case of the two beam-alternating light colorimeter according to the invention, only one measured value memory is used since neither oscillating parts nor rotary shutters are used.

In a manner which is essentially known, a current-voltage converter is connected after the photo sensitive element, the output of which converter is connectable in dependence upon the mirror position on the one hand directly via an analog memory and on the other hand indirectly to the inputs of a computing circuit. The computer circuit delivers an output voltage which corresponds to the function $k \cdot \log (U_m/U_r)$, whereby $k$ is a constant and $U_m$ and $U_r$ are voltages which are proportional to the intensity of the two measuring beams $I_r$ and $I_m$.

DESCRIPTION OF THE PREFERRED EMBODIMENTS

Figure 1:
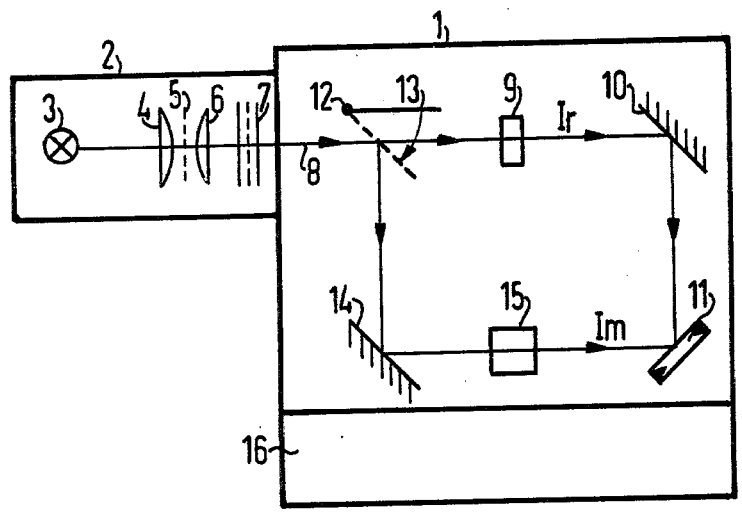
FIG. 1 shows the principle construction of the two beam-alternating light colorimeter of the invention.

According to FIG. 1, the two beam alternating or chopped light colorimeter consists of a housing 1 with an illumination lens system 2 which is installed in a wall portion. The illuminating lens system consists of a lamp 3, in particular a halogen lamp, two lenses 4 and 6, a shutter 5, and an interference filter 7. The optical axis of the measuring beam is designated 8. The measuring beam 8 is guided directly to a measuring cell 9, from which it exits after corresponding absorption, as a reference beam $I_r$, which is guided via a reflecting mirror 10 to a photo sensitive element 11.

In the vicinity of the optical axis 8 of the measuring beam, a mirror 13 is arranged which is pivotable around an axis 12 by 45° relative to the optical axis 8 of the measuring beam. The measuring beam now experiences a deflection of 90° and is guided via a further stationary mirror 14 to a measuring cell 15 with double the thickness of the measuring cell 9. From here it also proceeds as measuring beam Im to the photo sensitive element 11. In a separated space 16 the electronics are housed so that the total device forms a compact unit which can be housed relatively easily in an automatic analysis unit.

Figure 2A:
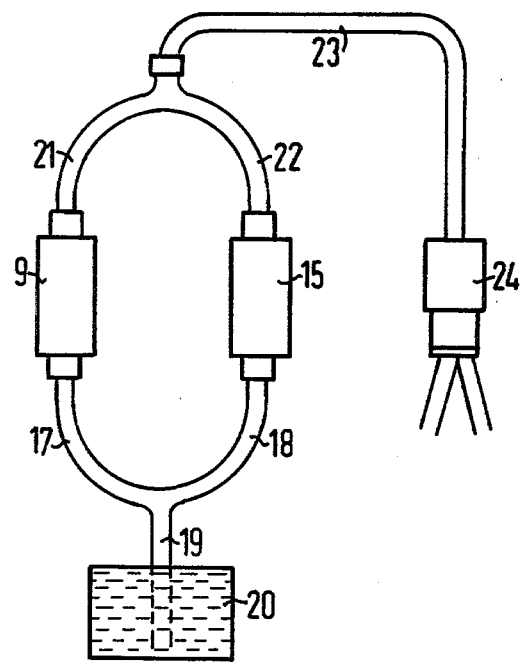
FIG. 2 shows the principle of the cell filling.

As FIG. 2a shows, the two measuring cells 9 and 15 are connected via hose pipes 17 and 18 with a common suction pipe 19 which dips into a container 20 in which the liquid to be tested is located. The container 20 can be a titrating container which can be provided with a stirring apparatus or such. The upper part of the two measuring cells 9 and 15 is connected via connection pipes 21 and 22 with a common pipe 23 connected with a syphon 24, which, for example, can be a dosaging syringe. With the help of the syphon 24, the sample is taken from the container 20 and conveyed into the cells 9 and 15.

The two measuring cells 9 and 15 can, however, also be connected one after the other and when necessary can also have the test liquid flowing through continuously.

Figure 2B:
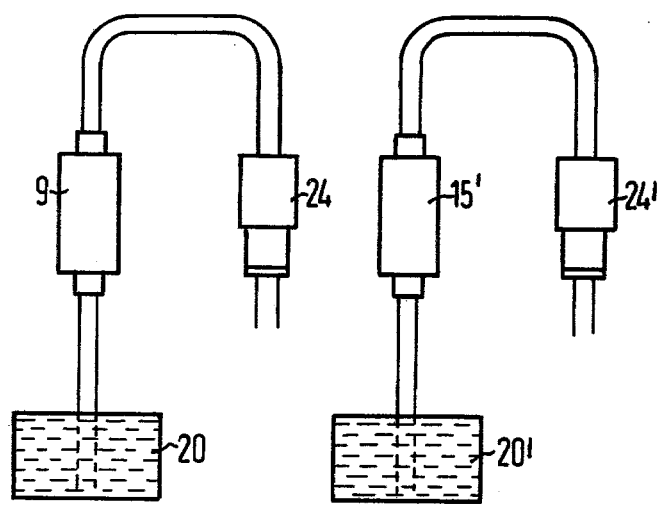

As FIG. 2b shows, the measuring cells 9 and 15' can have the same layer thickness wherein the measuring cell 9 contains the measuring solution 20 and the measuring cell 15' contains a reference solution 20'. For this system a further dosaging syringe 24' is necessary.

Figure 3:
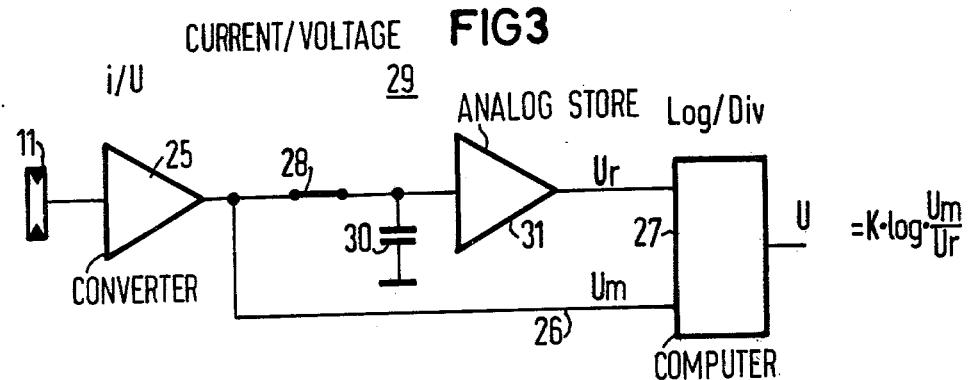
FIG. 3 shows a basic evaluating circuit.

FIG. 3 shows the measuring and evaluating circuit. The photo sensitive element 11 is connected with the input of a current-voltage converter 25. The output of the converter 25 is, on the one hand, connected directly via a line 26 with the one input of a computing circuit 27 and also is connected via a switching element 28 and an analog memory 29 with a second input of the computing circuit 27. The analog memory 29 consists of a capacitor 30 and an amplifier 31 with high resistance input. The switch 28 is activated corresponding to the position of the pivoting mirror 13. The switch position of the switch 28 according to FIG. 3 corresponds to the position of the mirror 13 according to FIG. 1. This means that the light beam, which is directed via the optical axis 8, penetrates only the measuring cell 9 and then proceeds via the mirror 10 to photo sensitive element 11.

The intensity Ir produces a current which is changed via the current-voltage converter 25 into a voltage Ur which corresponds to this. Via the closed switch 28, also the capacitor 30 is charged with this voltage. This voltage also is entirely present at the output of the amplifier 31 and it is supplied to the computing circuit 27. After the capacitor 30 has stored the voltage value Ur, the mirror 13 is pivoted into the position indicated by the broken line according to FIG. 1, whereby the light beam which enters via the optical axis 8 is conducted on to the mirror 14 and from there further through the measuring cell 15 to the photo sensitive element 11. With activation of the mirror 13 the switch 28 is opened, so that the corresponding signal Um which was released by the current-voltage converter is placed directly at the disposal of the computing circuit 27. The activation of switch 28 by the position of mirror 13 may be accomplished by any well known mechanical linkage. The computing circuit 27 now evaluates both signals. It is designed such that at the output, a signal U is released which is proportional to the product k·log Um/Ur. This signal is so constructed that it is proportional to the absorption of the solution and thus to the concentration of the substance which brings about the measured color intensity. This is attained by means of corresponding programming of the computing circuit 27. Such a computing circuit is known from U.S. Pat. No. 4,092,069 at A6 in FIG. 1, incorporated herein by reference.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A two beam colorimeter, comprising:
   a light source producing a light beam which passes through an illuminating lens system;
   beam control means receiving the light beam after the illuminating lens system and for producing first and second measuring beams, said beam control means comprising a pivotable mirror positioned to pivot into the light beam so as to produce one of the first or second measuring beams;
   the first measuring beam passing through a first measuring cell and the second measuring beam passing through a second measuring cell;
   reflecting mirror means for guiding the first and second measuring beams to a common photo sensitive element which creates first and second output signals;
   switching means synchronized with the pivotable mirror for connecting the first output signal to an analog memory at a time when a position of the pivotable mirror permits the first measuring beam to pass through the first measuring cell, and which disconnects the analog memory in correspondence with a position of the pivotable mirror which results in the second measuring beam passing to the second measuring cell; and
   computing means connected to receive the second output signal and the first output signal via an output of the analog memory for evaluating these signals.

2. A two beam colorimeter according to claim 1 wherein the computing means delivers an output voltage U which corresponds to the function k·log Um/Ur where k is a constant and Um and Ur are voltages received by the computing means which are proportional to an intensity of currents Ir and Im related to the two measuring beams.

3. A two beam colorimeter according to claim 1 wherein the first and second measuring cells have different layer thicknesses through which the liquid to be measured passes.

4. A two beam colorimeter according to claim 1 wherein the first and second measuring cells have a same layer thickness and wherein an object liquid passes through the first measuring cell and a reference solution passes through the second measuring cell.

5. The two beam colorimeter of claim 1 wherein a current-voltage converter is provided between the photo sensitive element and the switch means.

6. A two light beam colorimeter, comprising:
   a light source producing a light beam which is directed through a lens system having a shutter means for producing a chopped beam;
   a pivotable mirror which is arranged so that in a first position it does not deflect the light beam and permits the light beam as a first measuring beam to pass through a first measuring cell, and in a second position the pivotable mirror deflects the light beam as a second measuring beam through a second measuring cell;

fixed position deflecting means for causing the first and second measuring beams to impinge on a common photo sensitive element;

switch means for connecting a first signal from the photo sensitive element corresponding to the first measuring beam through to an analog memory means when the pivotable mirror is in the non-deflecting position creating the first measuring beam, and for disconnecting the analog memory from a second signal when the pivotable mirror is in the deflecting position creating the second measuring beam; and a computing means for producing an output voltage which is related to the first and second signals from the photo sensitive element resulting from the first and second measuring beams, said computing means being connected to an output of the analog memory so as to receive the first signal and to a point between the switching means and the photo sensitive element so as to receive the second signal.

* * * * *